United States Patent [19]

Müller et al.

[11] Patent Number: 4,488,345

[45] Date of Patent: Dec. 18, 1984

[54] METHOD AND APPARATUS FOR ASSEMBLING A WATCH CASE HAVING IMPROVED STRUCTURE FOR INSTALLING A BATTERY CELL

[75] Inventors: Jacques Müller, Reconvilier; Elmar Mock, Bienne, both of Switzerland

[73] Assignee: ETA S.A., Fabriques d'Ebauches, Granges, Switzerland

[21] Appl. No.: 391,739

[22] Filed: Jun. 24, 1982

[30] Foreign Application Priority Data

Jun. 24, 1981 [CH] Switzerland .................. 4166/81

[51] Int. Cl.³ .............................................. B23P 13/00
[52] U.S. Cl. .................................... 29/177; 29/432; 156/69; 156/73.1; 156/303.1; 156/309.6; 264/23; 264/249; 368/204
[58] Field of Search .............. 29/177, 432; 264/23, 264/25, 26, 249; 368/203, 204, 88; 220/293, 300, 301; 156/69, 73.1, 303.1, 309.6

[56] References Cited

U.S. PATENT DOCUMENTS

| | | | |
|---|---|---|---|
| 2,588,395 | 3/1952 | Lannen | 29/177 |
| 3,222,860 | 12/1965 | Raval | 368/204 |
| 3,597,913 | 8/1971 | Fujimori | 368/204 |
| 3,608,304 | 9/1971 | Schaad | 368/204 |
| 4,106,962 | 8/1978 | Adams et al. | 156/73.1 |
| 4,232,622 | 11/1980 | Weierman et al. | 156/69 |

Primary Examiner—Howard N. Goldberg
Assistant Examiner—P. W. Echols
Attorney, Agent, or Firm—Pollock, Vande Sande & Priddy

[57] ABSTRACT

A cover 20 for a cell cavity 7 in a plastic watch case 2 is provided on its periphery with three lugs 28. The back surface 4 of the case is provided with three recesses 12 into which the lugs can enter freely. With the aid of a tool 38, the cover is rotated while ultrasonic or thermal energy is applied to the lugs. Thanks to this energy, the lugs themselves deform and move into the thermoplastic material in order thereby to form three undercuts. A bayonet joint closure assembly is thus formed. See FIG. 5.

13 Claims, 8 Drawing Figures

METHOD AND APPARATUS FOR ASSEMBLING A WATCH CASE HAVING IMPROVED STRUCTURE FOR INSTALLING A BATTERY CELL

DESCRIPTION

1. Technical Field

The present invention relates to a method and means for installing a battery cell in a watch case in a fluid tight manner, the case being made of thermoplastic synthetic material. The invention is concerned with the problem of installing the cell in such a way as to achieve fluid-tightness with respect to the outside of the case of the watch. This is to protect the wearer of the watch against possible leakage of the electrolyte from the cell.

2. Background Art

It is well known to make one piece watch cases of thermoplastic synthetic material, typically by injection molding. This enables the cost of manufacture of the cases to be very considerably reduced since all the shaped parts of the case are defined during the injection molding operation.

Moreover, it is well known that one of the principal limitations of the operating life of such watches is the useful lifetime of its battery cells. It is therefore particularly important to be able to gain easy access to the cell to permit its replacement. In the case of one piece watch cases, that is, watches in which the back and the rest of the body of the case are made in only one piece, access to the interior of the case can be obtained only be removing the glass and the dial. In order to avoid this complicated operation and to enable the cell to be easily replaced, it is known in such watches to provide in the back of the case an opening or passage for the insertion and removal of the cell, the opening or passage normally being closed by a cover. It is sufficient to remove this cover in order to gain access from the outside to the cavity in which the cell is housed.

Swiss Pat. No. 552 241, published on July 31, 1974, describes a watch which has a one piece case made of synthetic material in which the back of the case is formed with an opening for the insertion and removal of the cell, the opening being closed by a cover. The cover is held in the cell opening by the cooperation of a flange formed in the periphery of the opening with a corresponding groove in the periphery of the cover. The cover is therefore fixed by means of a catch in the cell opening. This solution has the advantage of being simple, but it has the major disadvantage that it does not ensure a degree of fluid-tightness which conforms to the present standard requirements or at least does not ensure this degree of fluid-tightness throughout the required period of time.

DISCLOSURE OF THE INVENTION

In order to overcome these disadvantages, a first object of the invention is to provide means for closing the opening for the cell which ensure a high degree of fluid-tightness.

A second object of the invention is to provide a fluid-tight closure of the opening for the cell with means that are compatible with the production of the watch case by injection molding.

A third object of the invention is to provide means for closing the opening for the cell in which the positioning of the closure during the initial assembly of the watch does not necessitate any complicated operation and is easily compatible with assembly line production of the corresponding watches.

These objects of the invention are given only by way of example. Thus, those skilled in the art may perceive or become aware of other desirable objectives and advantages inherently achieved by the disclosed invention. Nonetheless, the scope of the invention is to be limited only by the appended claims.

In accordance with the invention, a watch case made from thermoplastic synthetic material is provided with a circular opening which opens from the cavity for the cell to the outside of the watch and with a circular metal cover. The external surface of the back of the case has an annular groove surrounding the opening and at least two recesses opening into and extending radially from the groove. The recesses have an axial depth which is less than the thickness of the back of the case. Preferably, the closure has an axially extending flange in the form of a skirt of small depth, which extends into the groove and is provided with radially projecting lugs, one for each recess, the lugs having an axial thickness smaller than the depth of the recesses. At installation, the cell is inserted in the cell cavity and the cover is positioned so that its flange drops into the groove and its lugs drop freely into the recesses. Then torque and energy are applied to the cover so that, as the cover rotates, the lugs bite into the thick portions of the back separating the recesses and penetrate at least partly into these solid portions so as to ensure the fixing of the closure on the back of the case.

In other words, the installation of a closure in an entrance opening for the cell is completed by engaging a type of bayonet joint, the male portion of which is constituted by the lugs on the cover and the female portion, partly by the annular groove but particularly by the radial recesses. The female portion of the bayonet joint system is completed by an undercutting of the thick portions separating the recesses, the undercutting being produced by the lugs themselves, thus acting like a tool for cutting and shaping the thermoplastic synthetic material. It is this undercutting which ensures the fixing of the cover.

One advantage of this technique is that it solves the problem of the respective manufacturing tolerances for the lugs on the cover and the undercuts to be formed in the periphery of the cell-insertion opening, since these undercuts are produced by the lugs themselves. Another advantage is that installation of the cover on the back of the case is completed by a bayonet joint system which not only makes possible a high degree of fluid-tightness between the cover and the back of the case but also is compatible with production of the watch case by injection molding. It will be clearly apparent to the man skilled in the art that the formation of the undercuts would be impossible by injection molding.

Preferably, the supply of energy is provided at the same time as the rotation of the cover by the application of ultrasonic vibrations to the cover. These ultrasonic vibrations are transmitted to the lugs, the resulting vibrations of which permit the deformation of the thermoplastic material and hence the production of the undercuts.

The invention is concerned not only with the method of assembling the cover to the watch case, but also with the watch case provided with shaped parts which make this assembly possible and the combination of means which make the said assembly possible. That is, the particular shaped parts of the case, the particular shape of the cover and the implements for applying to the cover the torque and the necessary energy, for example ultrasonic vibrations, all comprise aspects of the present invention, as set out in the claims.

BRIEF DESCRIPTION OF THE DRAWINGS

The invention will be described with reference to the accompanying drawings, in which.

BEST MODE FOR CARRYING OUT THE INVENTION

Figure 1:
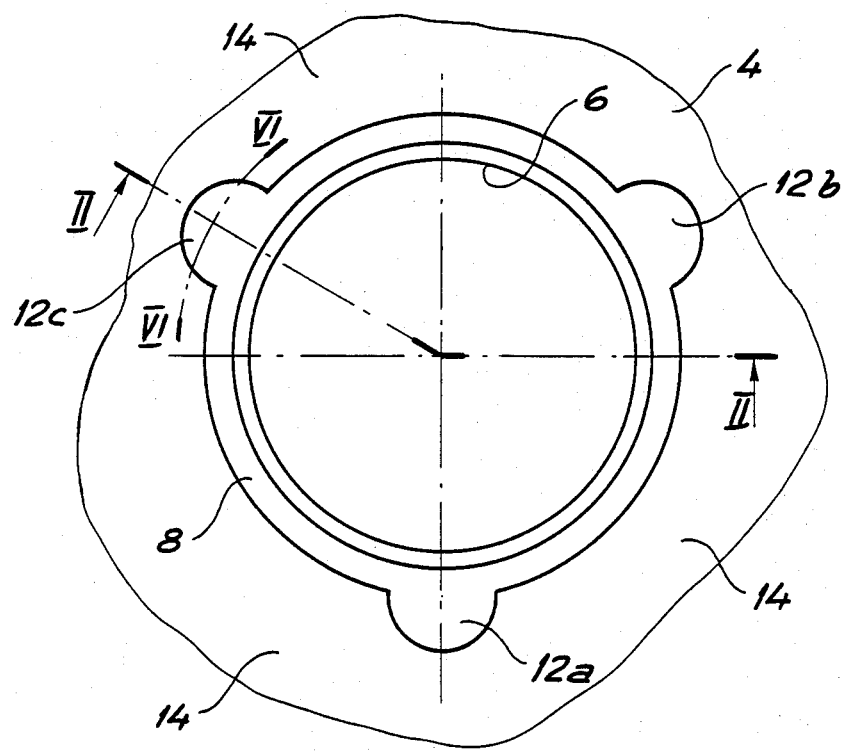
FIG. 1 shows a portion of the back of a one piece case having the shaped parts according to the invention.

The following is a detailed description of a preferred embodiment of the invention, reference being made to the drawings in which like reference numerals identify like elements of structure in each of the several Figures.

Figure 2:
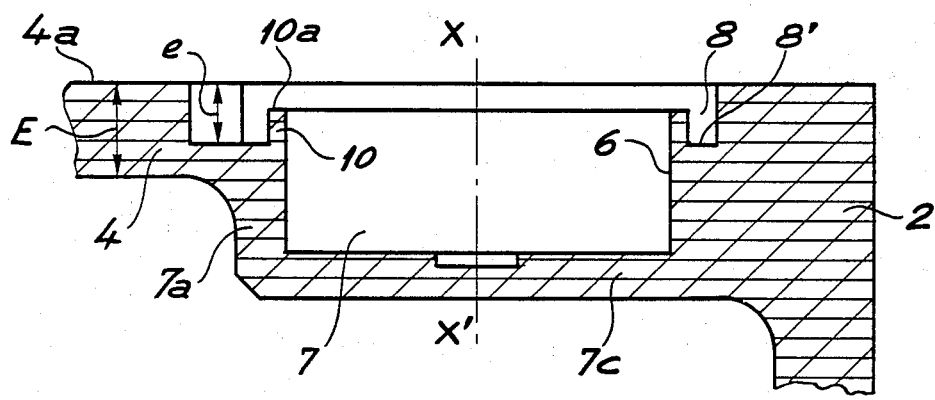
FIG. 2 is a sectional view of the back of the case taken on line II—II in FIG. 1.

FIGS. 1 and 2 show a portion of a one-piece watch case 2 made of a thermoplastic synthetic material. This case has a back 4 with an external surface 4a. The back 4 has a circular opening 6 which provides communication between a cell-cavity 7 and the outside of the watch. The external surface 4a of the back of the case is also provided with an annular groove 8 surrounding the opening 6. The groove 8 and the opening 6 are separated by land 10 having an outwardly facing supporting surface 10a of annular shape and parallel to the external surface 4a. The groove 8 is completed by three recesses 12a, 12b and 12c extending radially outwardly from the groove 8 and communicating with the latter. The groove 8 and the recesses 12 are preferably of the same depth e which is less than the thickness E of the back of the case. The recesses 12 are preferably of semi-cylindrical shape as shown in FIG. 1. The cell cavity 7 is moreover delimited by a side wall 7a and a base 7c formed by integral parts of the one-piece case. In FIG. 1, it is clearly apparent that recesses 12 are separated by solid parts 14.

Figure 3:
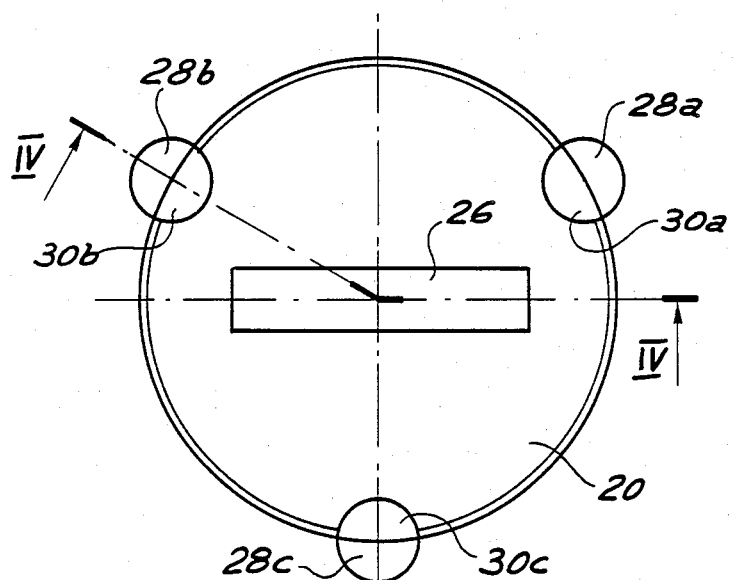
FIG. 3 is a top plan view of a cover for closing the entrance to the cell cavity.
Figure 4:
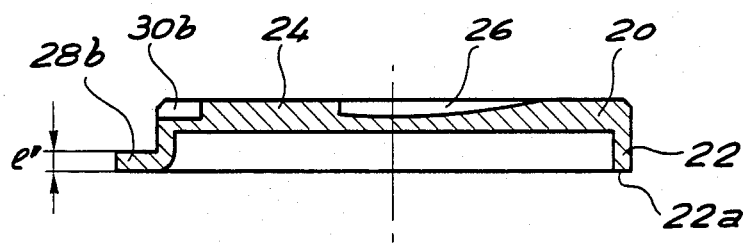
FIG. 4 is a sectional view taken on the line IV—IV in FIG. 3 showing the cover.

FIGS. 3 and 4 show a possible constructional form for the cover which serves for closing the entrance opening for the cell. This cover 20 is of generally circular shape and has on its periphery an axially extending flange 22 in the form of a skirt of small depth. In the center of the crown portion 24 of the cover there is formed a groove 26. As will be explained later in detail, groove 26 facilitates removal of the cover to enable the cell to be replaced. The flange 22 of the cover is provided with three lugs 28a, 28b and 28c which project outwardly from the cover along its radii. These lugs have an axial thickness e' which is in any case less than the depth e of the groove 8. The circumferentially measured width of the lugs 28 is less than that of the recesses 12 so as to enable the lugs 28 to be inserted freely into the recesses 12. The lugs have a semi-circular shape as shown in FIGS. 3 and 4. The cover also has three recesses or notches 30a, 30b and 30c located radially inwardly from lugs 28a, 28b and 28c. As will be explained later, these notches serve for the fixing of the cover on the back of the case. Although lugs 28 preferably extend radially outwardly and are essentially co-planar, it is also within the scope of this invention to position the lugs at acute angles to a plane perpendicular to the axis of the cover.

Figure 5:
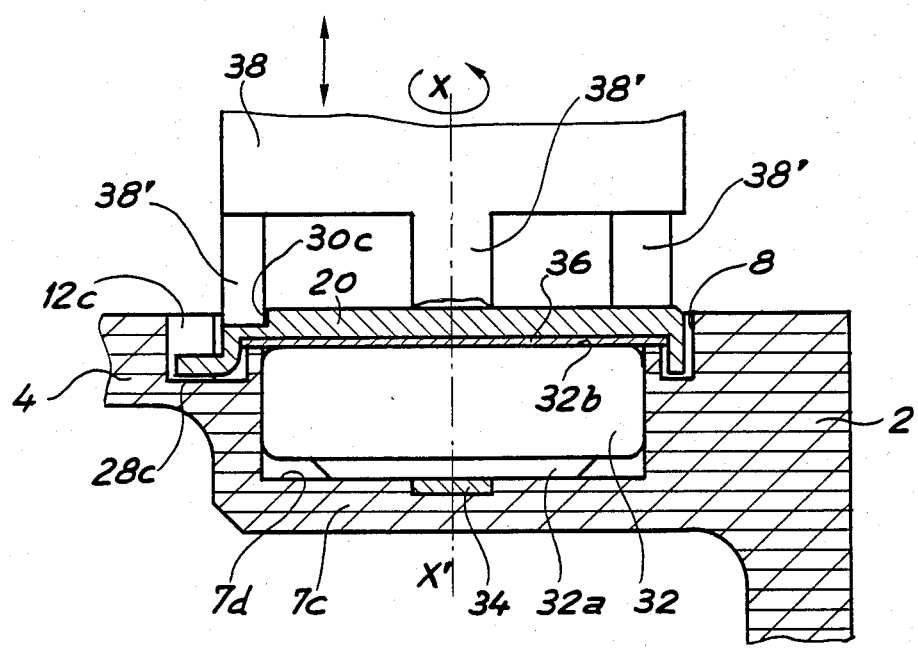
FIG. 5 is a view in vertical section similar to FIG. 2, but showing, in addition, the cell located in its cavity, the cover in the closed position and the tool used to install the cover.

FIG. 5 shows the positioning of the cell in its housing and the closing of the opening leading to the cell cavity. The cell 32 is provided in known manner with a first surface 32a which, for example, forms the negative electrode and a second substantially flat surface 32b. The cell 32 is positioned in its cavity 7 in such a manner that its negative electrode 32a contacts an electrical contact 34 mounted in the inner surface 7d of the base 7c of the cavity. A deformable sealing disk 36 is then placed over the upper surface 10a of the flange 10. In a subsequent step, the cover 20 is positioned in such a manner that the lugs 28a, 28b and 28c project freely into the recesses 12a, 12b and 12c and that the flange 22 of the cover projects into the groove 8. The sealing disk 36 is thus located between the inner surface of the cover on the one hand and the surface 32b of the cell 32 and the supporting surface 10a of the flange 10 on the other hand.

In order to ensure the fluid-tight fixing of the cover 20, a tool 38 is used as shown in FIG. 5. Preferably, this tool is an ultrasonic bit to which a vibratory movement along the axis X—X' is imparted by means of an ultrasonic generator. For example, the tool 38 can vibrate at a frequency of 40 kHz with an amplitude of the order of 5 microns. The operative portion of the tool 38 consists of three fingers 38' which are arranged so that they can project into the notches 30a, 30b and 30c. This tool performs a triple function. First of all, it enables a certain amount of pressure to be applied to the cover 20 in order to produce a slight compression of the sealing disk 36 which is preferably composed of a silicone material. Its second function is to act as a screwdriver in order to produce a rotation of the cover 20 by cooperation between the fingers 38' and the notches 30. Finally, the fingers transmit the vibrations to the cover 20 and hence in particular to the lugs 28.

Figure 6A:
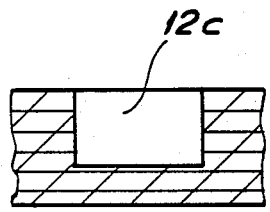
FIGS. 6a, 6b, and 6c illustrate different stages in the installation of the cover and make clear how the undercuts are formed by the lugs.
Figure 6B:
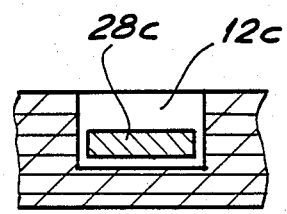
Figure 6C:
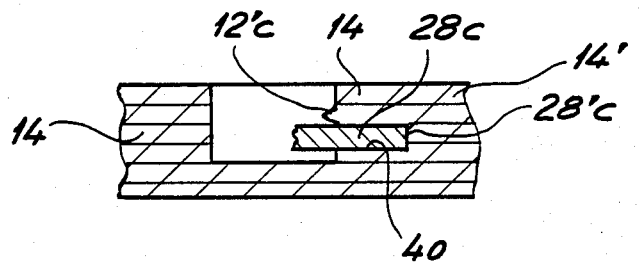

As has already been explained, the cooperation of the torque with the transmission of ultra high frequency sound waves to the lugs enables the undercuts to be produced in the solid parts 14 in order to provide for the fixing of the cover in the back of the case. FIGS. 6a to 6c illustrate the various different stages. In the stage shown in FIG. 6a, the cover has not yet been positioned. In the next stage, shown in FIG. 6b, the cover is positioned and in particular the lug 28c is freely engaged in the radial recess 12c. On the simultaneous application of the torque and of the vibrations to the lugs, the leading edge 28'c of the lugs 28c produces a local thermoplastic softening and deformation of the lateral wall 12'c of the recess 12c so as to form in the solid part 14 an undercut 40 into which the lug extends when the installation is complete. Undercut 40 is produced bit by bit by penetration of the lugs 28c into the solid part 14 until a substantial part of the width of the lugs 28c has penetrated into the thick part 14. Obviously, having regard to the relative thickness of the lugs 28c and of the solid part 14, a substantial portion 14' of the solid part 14 remains undeformed above the lugs 28c, thus ensuring the fixing of the cover on the back of the case.

It is clear that, since the undercut is formed by the lug itself which effects the securing, the securement is of very good quality and the cover is held perfectly against rotation with a substantial securing force. This securement consequently ensures the application of the negative electrode 32a of the cell 32 against the contact 34 and the application of the cover against the sealing disk 36. Accordingly, there is obtained effectively a very good fluid-tightness between the cover 20 and the back of the case via the sealing disk 36. If the lugs are angled downwardly in the direction of rotation, as previously discussed, a cam action is achieved as the lugs enter the solid part 14, thus producing further compression of sealing disk 36.

It must be added that the sealing disk 36 not only ensures fluid-tightness but also enables the vibrations produced by the tool 38 to be absorbed so that these vibrations are not transmitted as a whole to the cell. Moreover, since the notches 30, which are in direct contact with the fingers 38' and are adjacent the lugs 28, the path traversed by the vibrations between the source of vibration and the lugs is minimal, which limits the loss of energy.

In the embodiment so far described, the groove 8 is separated from the opening 6 by a land 10 which permits the positioning of the sealing disk 36. It is, however, clear that the land 10 need not be provided, in which case the groove 8 would open directly into the opening 6. Obviously, the recesses 12a, 12b, 12c would be retained. In such a construction, the sealing disk 36 could be located directly on the base 8' of the annular groove 8. The fluid-tightness would then be obtained by the cooperation of the sealing disk 36 with the end 22a of the flange 22 of the cover or with the lugs 28a at the locations where the latter are provided.

In order to remove the cell 32, it is sufficient to introduce the end of a tool into the groove 26 so as to cause the cover to rotate in the opposite direction, thereby loosening the cover from the case.

It should be added that, although the use of ultrasonic waves for providing the lugs of the cover with sufficient energy for forming the undercuts would appear to be the procedure best suited for carrying out this operation, it would also be possible to heat the lugs 28 at the same time the cover is rotated, in order to enable the undercuts to be formed.

INDUSTRIAL APPLICABILITY

Although the inventions disclosed are particularly suitable for use in the manufacture of watch cases made from synthetic material, those skilled in the art will appreciate that the inventions can be applied in other instances where a simple, fluid-tight cover is needed for an opening in a body of synthetic materials which deforms upon application of vibrating energy or heat.

Having described our invention in sufficient detail to enable those skilled in the art to make and use it, we claim:

1. A method of installing a battery cell in an outwardly opening cavity provided in a watch case made of thermoplastic material, comprising the steps of:
   providing a closure having a plurality of radially extending lugs, said closure being sized to close said cavity;
   providing around the opening of said cavity a corresponding plurality of radially extended, circumferentially spaced, outwardly opening recesses sized to receive said lugs when said closure is placed in said opening;
   positioning a cell in said cavity;
   positioning said closure at said opening with said lugs extending into said recesses;
   rotating said closure while applying energy to said lugs; and
   causing each of said lugs to engage a side wall of its respective recess, whereby said thermoplastic material softens sufficiently to permit said lugs at least partly to enter the portions of said watch case between said recesses as said closure is rotated, to form undercuts in which said lugs remain when said rotating ceases, thereby ensuring the secure installation of said closure.

2. A method according to claim 1, further comprising the steps of:
   providing around said opening an annular groove into which said recesses open; and
   providing on said closure an annular flange which enters said groove when said closure is installed.

3. A method according to claim 1 or 2, wherein said lugs are sized to have a thickness substantially less than the depth of said recesses.

4. A method according to claim 1 or 2, wherein said energy is applied by ultrasonically vibrating said lugs.

5. A method according to claim 2, further comprising the steps of:
   providing an outwardly facing annular support surface in said watch case between said opening and said annular groove; and
   prior to positioning said closure across said opening, placing a deformable seal element on said support surface, whereby said closure engages said seal element and compresses it against said support surface to provide a fluid-tight seal for said cavity.

6. A method according to claim 1 or 2, wherein said energy is applied by directly heating said lugs.

7. Apparatus for installing a closure at an outwardly opening cavity for a battery cell, said cavity being provided in a watch case made of thermoplastic material, said apparatus comprising:
   a plurality of radially extended, circumferentially spaced, outwardly opening recesses positioned around the opening of said cavity;
   a corresponding plurality of radially extending lugs provided on said closure, said lugs being sized to be received by said recesses when said closure is positioned at said opening; and
   means for forming a corresponding plurality of undercuts in a side wall of each recess by rotating said closure while applying energy to each of said lugs, whereby said thermoplastic material is softened sufficiently to permit said lugs at least partly to enter and engage the portions of said watch case between said recesses as said closure is rotated, thereby ensuring the secure installation of said closure.

8. Apparatus according to claim 7, further comprising an annular groove around said opening, into which said recesses open and an annular flange on said closure which enters said groove when said closure is installed.

9. Apparatus according to claim 7 or 8, wherein said lugs are sized to have a thickness substantially less than the depth of said recesses.

10. Apparatus according to claim 8, further comprising an outwardly facing annular support surface in said watch case between said opening and said annular groove and a deformable seal element positioned between said support surface and said closure, whereby said closure engages said seal element and compresses it against said support surface to provide a fluid-tight seal for said cavity.

11. Apparatus according to claim 7 or 8, wherein said energy is applied by ultrasonically vibrating said lugs.

12. Apparatus according to claim 7 or 8, wherein said energy is applied by directly heating said lugs.

13. Apparatus according to claim 7 or 8, wherein said closure is provided with a notch portion adjacent each of said lugs and said means for forming comprises a corresponding plurality of fingers for engaging said notch portions to apply torque to said closure and to apply said energy.

* * * * *